United States Patent [19]

Ari et al.

[11] Patent Number: 4,672,523

[45] Date of Patent: Jun. 9, 1987

[54] PROTECTIVE DEVICE FOR A LOAD CONNECTED TO A POWER SUPPLY LINE OF AN ELECTRIC POWER SYSTEM

[75] Inventors: Niyazi Ari, Nussbaumen; Diethard Hansen, Berikon; Hendrik Hoitink, Windisch; Hans Schär, Basel, all of Switzerland

[73] Assignee: BBC Brown, Boveri & Company, Limited, Baden, Switzerland

[21] Appl. No.: 854,597

[22] Filed: Apr. 22, 1986

[30] Foreign Application Priority Data

Apr. 30, 1985 [CH] Switzerland .................. 1832/85

[51] Int. Cl.$^4$ ........................................ H02H 7/10
[52] U.S. Cl. .................................. 363/50; 361/111
[58] Field of Search ............... 363/50, 51; 361/117, 361/118, 100, 101, 111; 364/162, 163

[56] References Cited

FOREIGN PATENT DOCUMENTS 516932  7/1981  Australia .
209549  5/1984  Fed. Rep. of Germany ...... 361/101
2060299 4/1981  United Kingdom .

Primary Examiner—Peter S. Wong
Assistant Examiner—Judson H. Jones
Attorney, Agent, or Firm—Burns, Doane, Swecker & Mathis

[57] ABSTRACT

The present invention relates to a protective device for a load connected to a power supply line of an electric power system, comprising an LC network having low-pass characteristics, connected into the power supply line on the system side preceding the load. So that disturbances with frequencies below the cut-off frequency of the LC network can also be kept away from the load, a switching element controlled by a monitoring device is arranged according to the invention in series with the LC network in the power supply line. The monitoring device is connected to the power supply line on the system side at a junction preceding the switching element and keeps the switching element closed only for as long as the instantaneous value of the time derivation of the voltage on the power supply line deviates from the instantaneous value of a nominal value which is predeterminable in its variation with time, by no more than an equally predeterminable amount.

13 Claims, 1 Drawing Figure

PROTECTIVE DEVICE FOR A LOAD CONNECTED TO A POWER SUPPLY LINE OF AN ELECTRIC POWER SYSTEM

BACKGROUND OF THE INVENTION

The present invention relates to a protective device for a load connected to a power supply line of an electric power system. More particularly, the present invention relates to a protective device including an LC network having low-pass characteristics and connected into the power supply line before a load.

Protective devices of this type, which can also be called line filters, are used for keeping disturbances present on the power supply line away from the load, for example a sensitive electronic device. A large number of various designs of such protective devices are known. However, a problem common to all these embodiments is that only high-frequency disturbances in the radio-frequency range are sufficiently well suppressed. Thus, the lower cut-off frequency of the known line filters is rarely much below 50 khz. Known protective devices do not adequately suppress disturbances with lower frequencies or ramp-shaped rises such as are caused, for example, by post-arcing currents of lightning, switching surges or by slow electro-magnetic pulses (this particularly refers to MHD EMP's, the magneto-hydrodynamic electromagnetic pulses occurring as a delayed consequence of the ignition of nuclear explosive charges above the layer of atmosphere of the earth), H. W. Zaininger, Electromagnetic Pulse (EMP) Interaction with Electric Power Systems; Report ORNL/Sub.-82-47905/1, August 1984, Zainiger Engineering Company, 3408 Vance Court, San Jose, Calif. 95132. Although passive LC networks having arbitrarily low cut-off frequencies can be theoretically implemented by using sufficiently large capacitances and inductances, the achievable lower cut-off frequency, in practice, has a value of approximately the aforementioned value of 50 kHz. The reason for this is, on the one hand, that the magnitude of the capacitances is limited for safety reasons, particularly for reasons of contact protection. On the other hand, the magnitude of the inductances is also limited from the point of view of the practicality of their physical size.

The present invention achieves the object of specifying a protective device of the type initially mentioned which can also be used for keeping disturbances with frequencies below the cut-off frequency of the LC network safely away from the load.

Essentially, the advantages of the invention can be seen in the fact that the object aimed at by the invention is achieved without using capacitances which are doubtful from the point of view of safety and unmanageably large and extensive inductances.

BRIEF DESCRIPTION OF THE DRAWINGS

Other advantages of the invention, features and objects of the invention will become apparent from the following detailed description of a preferred embodiment when read in light of the accompanying drawing in which.

DETAILED DESCRIPTION OF THE PREFERRED EMBODIMENT

Figure 1:
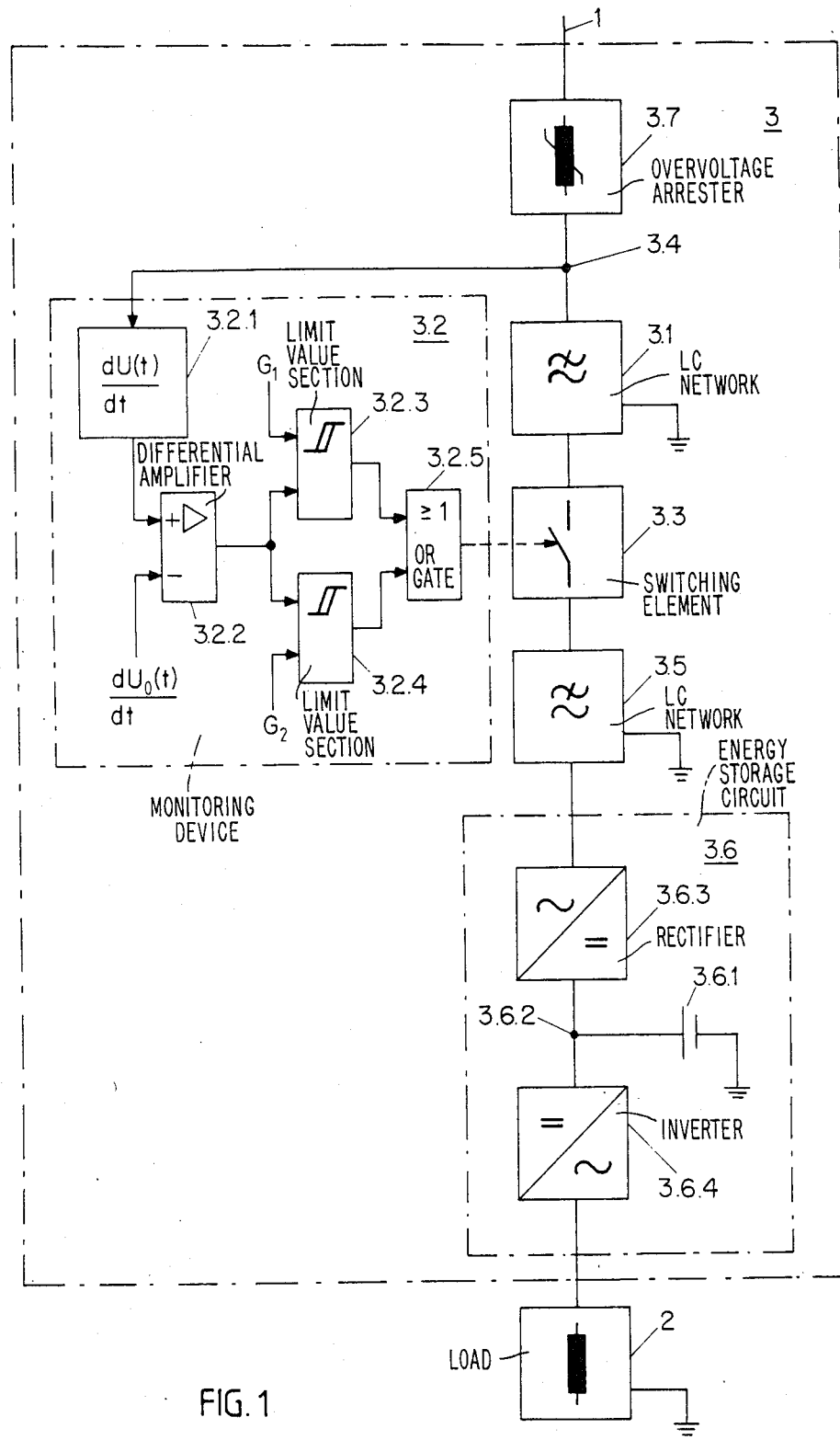
FIG. 1 shows a block diagram of a protective device according to the invention.

Referring to FIG. 1, a power supply line 1 of an electric power system, an electric load 2 and a protective device 3 for the load 2 are illustrated. The power supply line 1 can be, for example, a 220 V alternating current line or a direct-current line. The load 2 can be, for example, an electronic circuit. However, since the type of load 2 is not important for explaining the invention, it is only symbolically represented by an impedance in a rectangle. The protective device 3 is arranged at the system side in front of the load 2 in the power supply line 1 and is provided with an LC network 3.1 having low-pass characteristics, which is connected into the power supply line 1. A switching element 3.3 controlled by a monitoring device 3.2 is arranged in series with the LC network 3.1 in the power supply line 1. The monitoring device 3.2 is connected to the power supply line 1 at the system side at a junction 3.4 preceding the switching element 3.3.

The monitoring device 3.2 keeps the switching element 3.3 closed as long as the instantaneous value of the derivative of the voltage on the power supply line with respect to time deviates from the instantaneous value of a nominal value, the variation with time of which can be predetermined, of this time deviation by no more than an equally predeterminable amount. If, in contrast, the predeterminable amount of the permissible deviation is exceeded, for example due to a critical disturbance on the power supply line 1, the switching element 3.3 is opened by the monitoring device 3.2. Naturally, the disturbance causing the respective deviation and opening of the switching element 3.3 cannot reach the load 2 when the switching element 3.3 is opened. The switching element 3.3 is closed again by the monitoring device 3.2 only when the disturbance has dissipated, that is when the deviation has returned back to below its maximum permissible value. Thus, it can also be said that the disturbance is keyed out.

The monitoring device 3.2 shown in FIG. 1 could be constructed of a differentiating section 3.2.1, a differential amplifier 3.2.2, two limit-value sections 3.2.3 and 3.2.4 and an OR gate 3.2.5. With such a configuration, first the time derivative $dU(t)/dt$ of the voltage on the power supply line 1 would be formed in the differentiating section 3.2.1. The differential amplifier 3.2.2 would form the difference between the respective instantaneous value of this derivation and the instantaneous value of its respective nominal value $dU_o(t)/dt$ which would have to be supplied to the differential amplifier 3.2.2. This difference would be compared in the limit-value sections 3.2.3 and 3.2.4 with a positive limit value $G_1$ and a negative limit value $G_2$. The digital outputs of the two limit-value sections 3.2.3 and 3.2.4 would finally be combined by the OR gate 3.2.5 to form a common output by means of which the switching element 3.3 would be opened whenever the positive limit value $G_1$ would be exceeded in the positive direction or the negative limit value $G_2$ would be exceeded in the negative direction.

An electromagnetic switch (for example a reed relay), a transistor switch, a thyristor but preferably a gate-turn off thyristor (GTO) can be used as switching element 3.3. The advantage of transistor or thyristor switches is primarilly due to their rapid switching capability which, for example, makes it possible to switch on again with the correct phase after the switch has been opened. The advantages of electromechanical switches lie, for example, in the electric isolation which can be achieved by them. In addition, the power loss associated with electromechanical switches is generally lower than that of semiconductor switches. With current in the kA range, the residual voltage of semiconductor switches within a range of approximately 0.2 to 1 Volt can have a very unfavorable effect. For the rest, switching times of less than 1 millisecond can also be achieved with read relays.

Between the junctin 3.4 and the switching element 3.3, a time delay section is preferably provided in the power supply line 1. The time delay section is used for delaying the transit time of a disturbance between the junction 3.4 and the switching element 3.3. The transit time delay is preferably selected in such a manner that the monitoring device 3.2 has sufficient time for opening the switching element 3.3 even before the disturbance reaches it. As a time delay section, the LC network 3.1 can be used, for example, as shown in FIG. 1. The LC network 3.1 also prevents power-system reactions due to switching peaks caused by the switching element 3.3.

To keep the switching peaks caused by the switching element 3.3 away from the load 2, another LC network 3.5 having low-pass characteristics is preferably arranged on the load side following the switching element 3.3 in the power supply line 1, as shown in FIG. 1.

So that the load 2 is not without power supply whilst the switching element 3.3 is opened, an energy storage circuit 3.6 is also provided on the load side following the switching element in the power supply line 1, as again shown in FIG. 1. This circuit can include, for example, a battery 3.6.1 connected to the power supply line 1, in which arrangement, if the power supply line 1 is an alternating-voltage line, a rectifier 3.6.3 would have to be additionally arranged in the power supply line 1 on the system side before the junction 3.6.2 of the battery 3.6.1 and an inverter 3.6.4 on the load side following this junction. Under certain circumstances, a capacitor having a sufficiently high capacitance is sufficient instead of the battery.

Finally, an overvoltage arrestor 3.7 can also be provided preferably on the system side preceding all other elements of the protective device 3. The over-voltage arrester 3.7 can be, for example, a ZnO varistor.

The principles, preferred embodiments, and modes of operation of the present invention have been described in the foregoing specification. The invention which is to be protected herein, however, is not to be construed as being limited to the particular forms disclosed, since these are to be regarded as illustrative rather than restrictive. Variations and changes may be made by those skilled in the art without departing from the spirit of the invention.

What is claimed is:

1. A protective device for a load connected to a power supply line of an electric power system, comprising a first LC network having low-pass characteristics connected into the power supply line on the system side preceding the load, and further comprising a switching element controlled by a monitoring device and connected in series with said first LC network into the power supply line, wherein the monitoring device is connected to the power supply line on the system side at a junction preceding the switching element and maintains the switching element closed only for as long as the instantaneous value of the derivative of the voltage on the power supply line with respect to time does not deviate from a first predeterminable value by more than a second predeterminable value, wherein said first value is variable with time and can be predetermined in its variation with time, the switching element is an electronic switching element and between the junction of the monitoring device and the switching element a delay section having a transit-time delay greater than or equal to the operating delay of the monitoring device is provided in the power supply line.

2. The protective device of claim 1, wherein said switching element is an electromechanical switch.

3. The protective device of claim 1, wherein said first LC network acts as a delay section.

4. The protective device of claim 1, further including a second LC network having low-pass characteristics connected into the power supply line such that the switching element is arranged between said first LC network and said second LC network.

5. The protective device of claim 1, further including at least one overvoltage arrestor arranged on the system side preceding said first LC network.

6. The protective device of claim 1, further including a power storage circuit arranged on the load side following the switching element, said power storage circuit operative to supply power to the load when the switching element is opened.

7. The protective device of claim 6, wherein the power storage circuit includes a battery connected to the power supply line.

8. The protective device of claim 7, wherein said power supply line provides alternating current, and further including a rectifier provided on the system side preceding the battery and an inverter provided on the load side following the battery.

9. The protective device of claim 6, wherein the power storage circuit includes a capacitor.

10. The protective device of claim 9, wherein said power supply line provides alternating current, and further including a rectifier provided on the system side preceding said capacitor and an inverter provided on the load side following said capacitor.

11. The protective device of claim 1, wherein said switching element is a transistor switch.

12. The protective device of claim 1, wherein said switching element is a thyristor.

13. The protective device of claim 12, wherein said thyristor is a gate turn-off thyristor.

* * * * *